United States Patent
Yu et al.

(10) Patent No.: US 8,051,766 B1
(45) Date of Patent: Nov. 8, 2011

(54) MECHANISM AND TOP FOR PERSONAL BEVERAGE PRESS

(75) Inventors: Henry K. Yu, Los Angeles, CA (US); Manuel A. Montano, Torreance, CA (US)

(73) Assignee: Black Design Associates, LLC, El Segundo, CA (US)

( * ) Notice: Subject to any disclaimer, the term of this patent is extended or adjusted under 35 U.S.C. 154(b) by 839 days.

(21) Appl. No.: 12/056,270

(22) Filed: Mar. 26, 2008

Related U.S. Application Data

(60) Provisional application No. 60/908,011, filed on Mar. 26, 2007.

(51) Int. Cl.
*A47J 31/20* (2006.01)
*A47J 31/18* (2006.01)

(52) U.S. Cl. .............. 99/297; 99/287; 220/625

(58) Field of Classification Search ........... 99/297, 99/287; 100/116, 125; 220/625, 23.87
See application file for complete search history.

(56) References Cited

U.S. PATENT DOCUMENTS

| | | | | |
|---|---|---|---|---|
| 1,797,672 A | * | 3/1931 | Paolini | 99/316 |
| 3,158,084 A | * | 11/1964 | Cohn | 99/297 |
| 3,279,351 A | * | 10/1966 | Cohn | 99/282 |
| 3,339,476 A | * | 9/1967 | De Troya | 99/287 |
| 5,478,586 A | | 12/1995 | Connor | |
| 5,635,233 A | | 6/1997 | Levinson | |
| 5,887,510 A | | 3/1999 | Porter | |
| 5,932,098 A | | 8/1999 | Ross | |
| 6,135,010 A | * | 10/2000 | Husted et al. | 99/319 |
| 6,231,909 B1 | | 5/2001 | Levinson | |
| 7,194,951 B1 | | 3/2007 | Porter | |
| 2006/0021524 A1 | * | 2/2006 | Liu | 100/116 |
| 2007/0151461 A1 | | 7/2007 | Edmark | |

OTHER PUBLICATIONS www.bodumusa.com; 7 page printout from Internet Website on Mar. 27, 2008.
www.oxo.com; 2 page printout from Internet Website on Mar. 27, 2008.
www.rei.com; 17 page printout from Internet Website on Mar. 27, 2008.
Craftsupplies of Provo, Utah, "Click Pen Assembly Instructions." 1 page.

* cited by examiner

*Primary Examiner* — Reginald L Alexander
(74) *Attorney, Agent, or Firm* — Law Office of David Hong

(57) ABSTRACT

There is an apparatus for brewing and making a personal beverage, which combines an independently sliding filter apparatus and a push button opening and closing mechanism, which coordinate vertically applied pressure and controlled rotational movement.

4 Claims, 14 Drawing Sheets

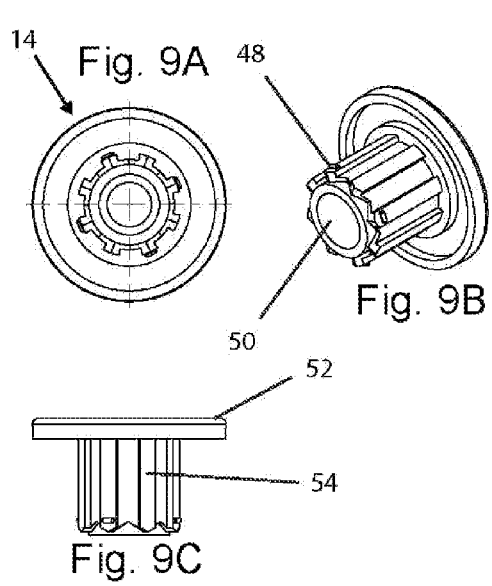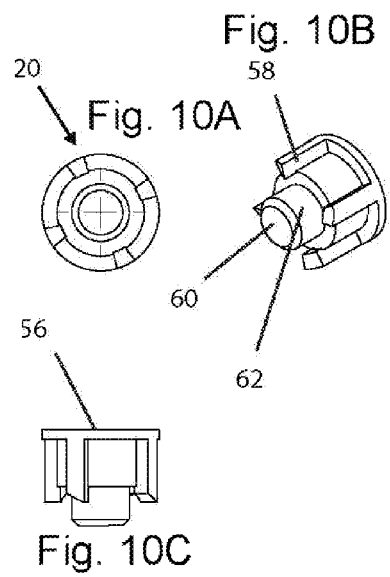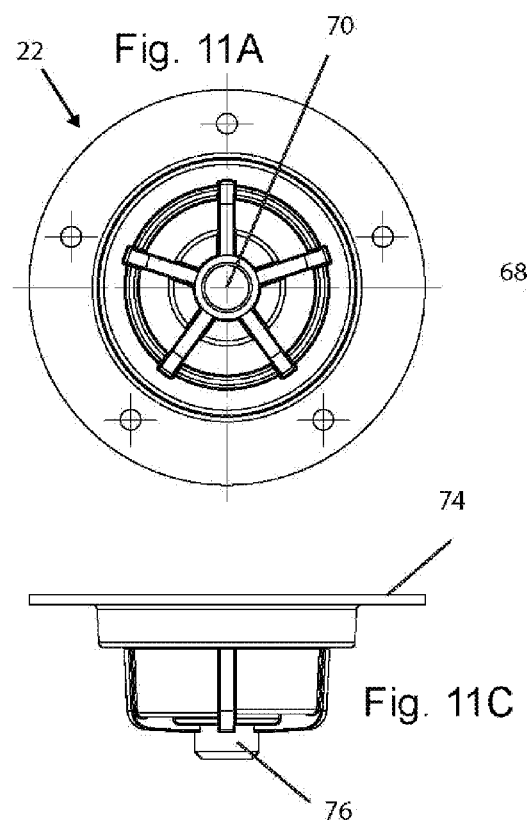

Fig. 12A
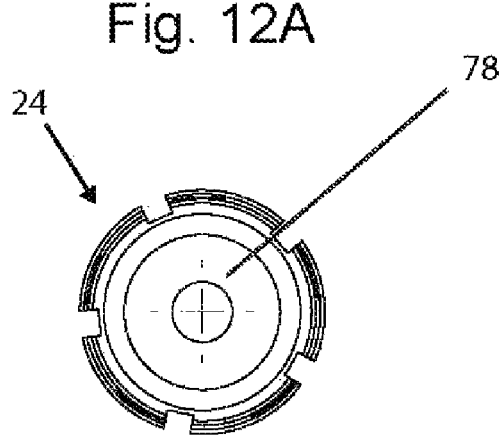
Fig. 12B
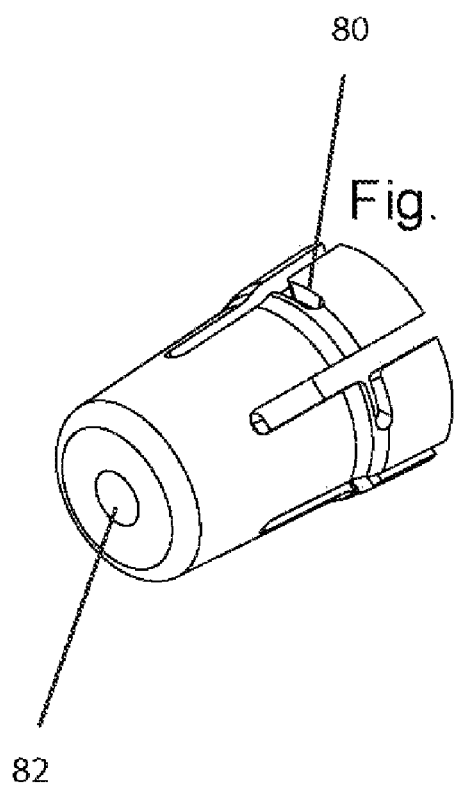
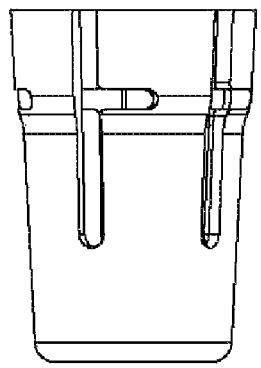
Fig. 12C

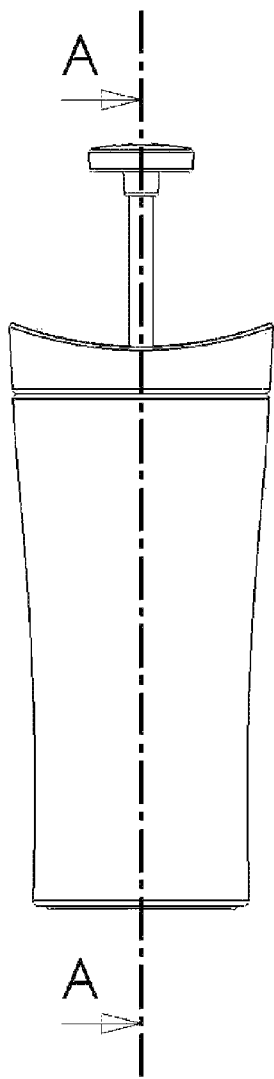
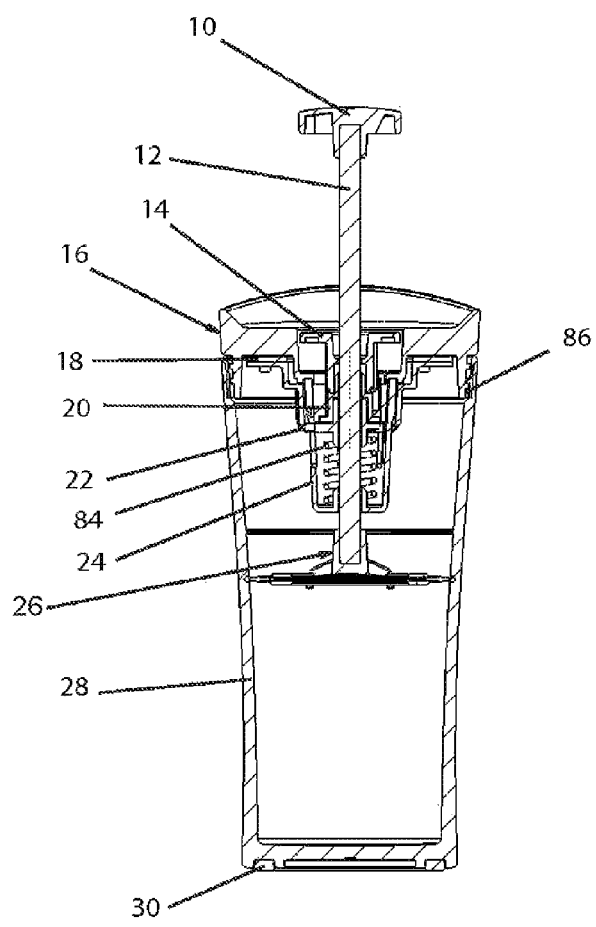
fig. 14
fig. 15

MECHANISM AND TOP FOR PERSONAL BEVERAGE PRESS

This application claims the benefit of U.S. Provisional Utility Patent Application No. 60/908,011, filed Mar. 26, 2007, which is incorporated by reference.

BACKGROUND OF THE INVENTION

1. Field of the Invention

This invention related to mechanisms used with personal beverage presses for coffee, tea and other brewed or steeped beverages.

2. Description of Related Art

Prior to the present invention, personal beverage presses or French Style Coffee Presses used a handle or knob connected to the press shaft. When a user pressed this handle or knob all the way down the brewing container, the handle remained as an uncomfortable obstruction when drinking. In addition, the handle or knob did not offer an interface for incorporating an open and close mechanism for the drink hole. Another problem was that there are no extra preventative measures to prevent unwanted post-press sediment from going through the drink hole. From the preceding descriptions, it is apparent that the devices currently being used have significant disadvantages. Thus, important aspects of the technology used in the field of invention remain amenable to useful refinement.

SUMMARY OF THE INVENTION

The purpose of the present invention is to provide an easy-to-use human interface for a personal beverage press that hides the press handle from obstructing comfortable drinking. Another purpose of the present invention is to incorporate the press handle to work with an apparatus for closing and opening the drink hole. Another purpose of the present invention is to incorporate a reservoir section near the drink hole to collect and move unwanted sediments away from the drink hole. Another purpose of this invention to prevent over brewing of the brewed beverage with the beverage flavoring materials.

An apparatus for brewing a liquid beverage with a beverage flavoring material comprising a cup having an open top end and a closed bottom end; a sidewall extends from the bottom end to the open top end of the cup; a lid, which removably engages the open top end of the cup, and has a first lid opening and a second lid opening and a third lid opening, which is centrally disposed; the lid having a first lid end and a second lid end; a hollow shaft slidably engages the centrally disposed second lid opening; the shaft has a first shaft end and a second shaft end; the first shaft end has an activation button; the second shaft end has a filter assembly; the filter assembly comprises a first filter housing and a second filter housing; between the first and second filter housings, there is a flexible check valve and a filter; the lid further comprising an opening and closing mechanism; the opening and closing mechanism having: a handle platform having a first handle platform end and a second handle platform end and a centrally located handle platform opening, which can slidably engage the shaft; the first handle platform end being able to engage the activation button; a cog structure, which can rotate around a vertical axis of the shaft; said cog structure having a first cog end and a second cog end and a centrally located cog structure opening, which can slidably engage the shaft; the second cog end being able to removably engage the second handle platform end and the second lid end; a plunger structure with a first plunger end and a second plunger end and a centrally located plunger opening, which can slidably engage the shaft; a gasket is fixedly attached to the first plunger end and can removably contact said first and second lid openings; a spring; a spring housing with a first spring housing end and a second spring housing end and a centrally located spring housing opening, which can slidably engage the shaft; the first spring housing end is removably connected to the second lid end; the spring is placed between the second spring housing end and the second end of the plunger, whereby the sliding shaft allows movement of the filter apparatus to be moved from a first elevation to a lower second elevation to separate the beverage flavoring material from the liquid beverage and the opening and closing mechanism can assume a first closed position to a second open position.

The present invention introduces such refinements. In its preferred embodiments, the present invention has several aspects or facets that can be used independently, although they are preferably employed together to optimize their benefits. All of the foregoing operational principles and advantages of the present invention will be more fully appreciated upon consideration of the following detailed description, with reference to the appended drawings.

PARTS LIST FOR FIRST EMBODIMENT SHOWN IN FIG. 1-5

Figure 1:
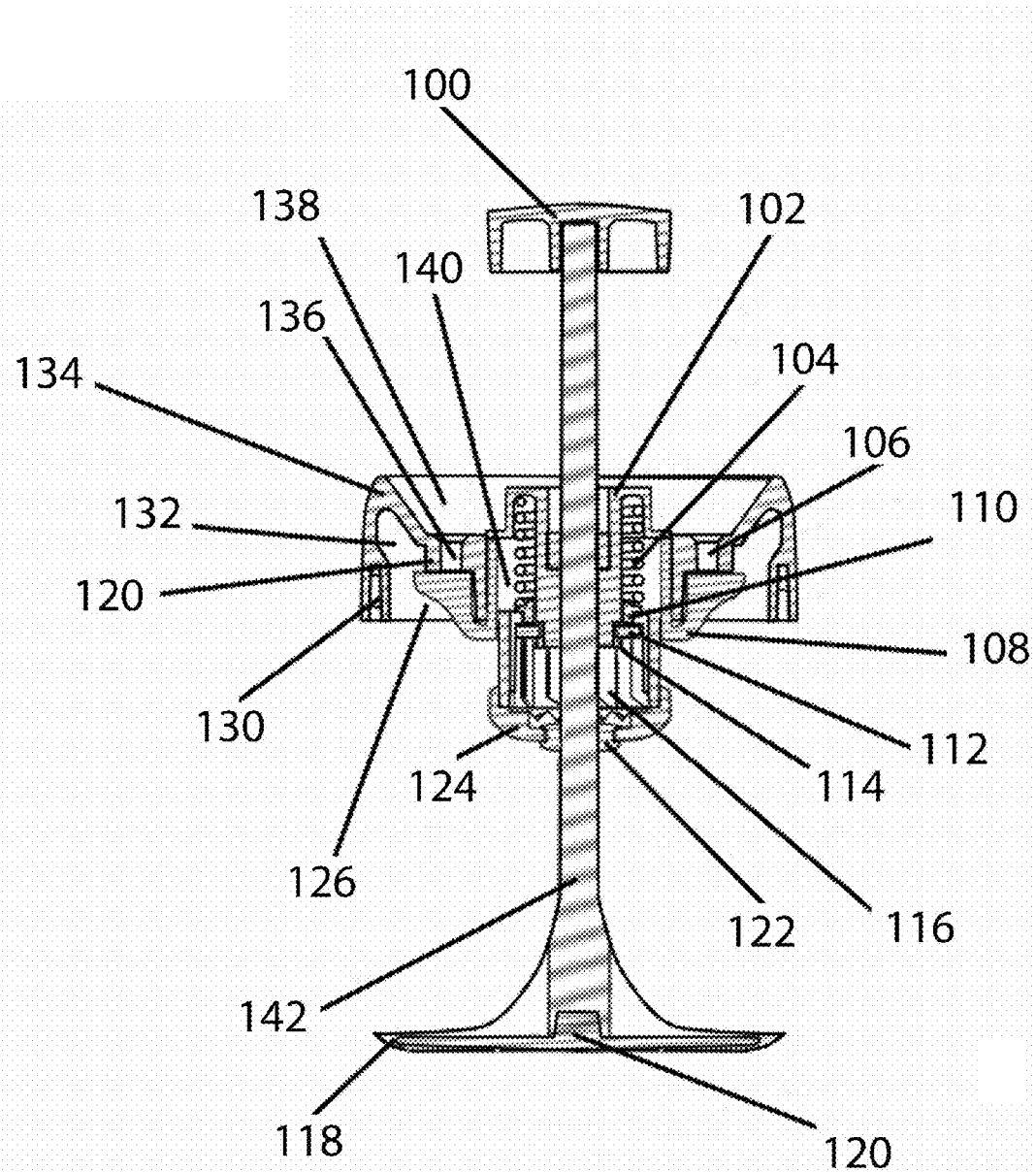
FIG. 1 is a view of one embodiment of the invention, which shows a split side plan view of the invention.
Figure 2:
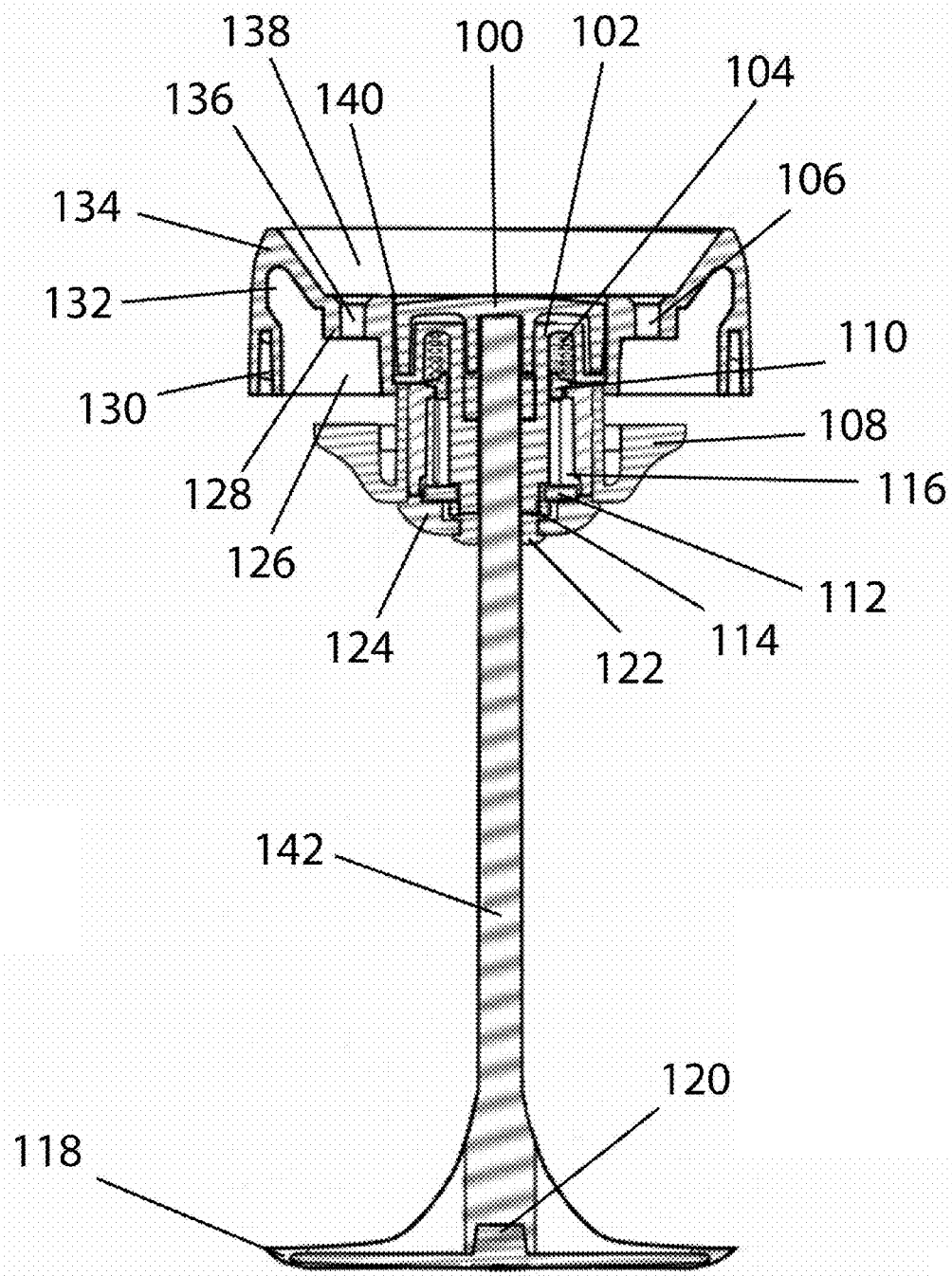
FIG. 2 is a view of one embodiment of the invention, which shows a split side plan view of the invention in the pressed position.
Figure 3:
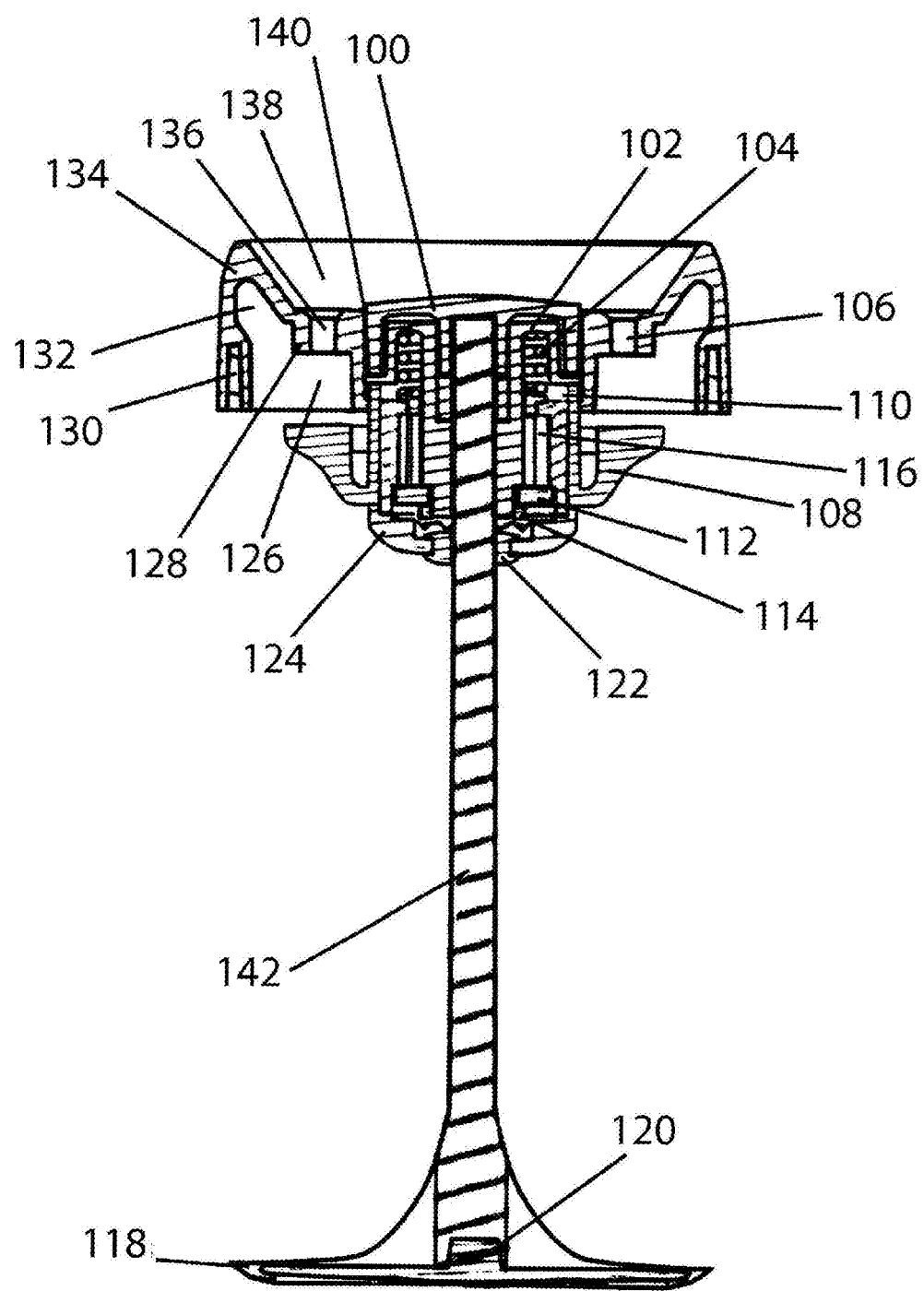
FIG. 3 is a view of one embodiment of the invention, which shows a split side plan view of the invention in the open position.
Figure 4:
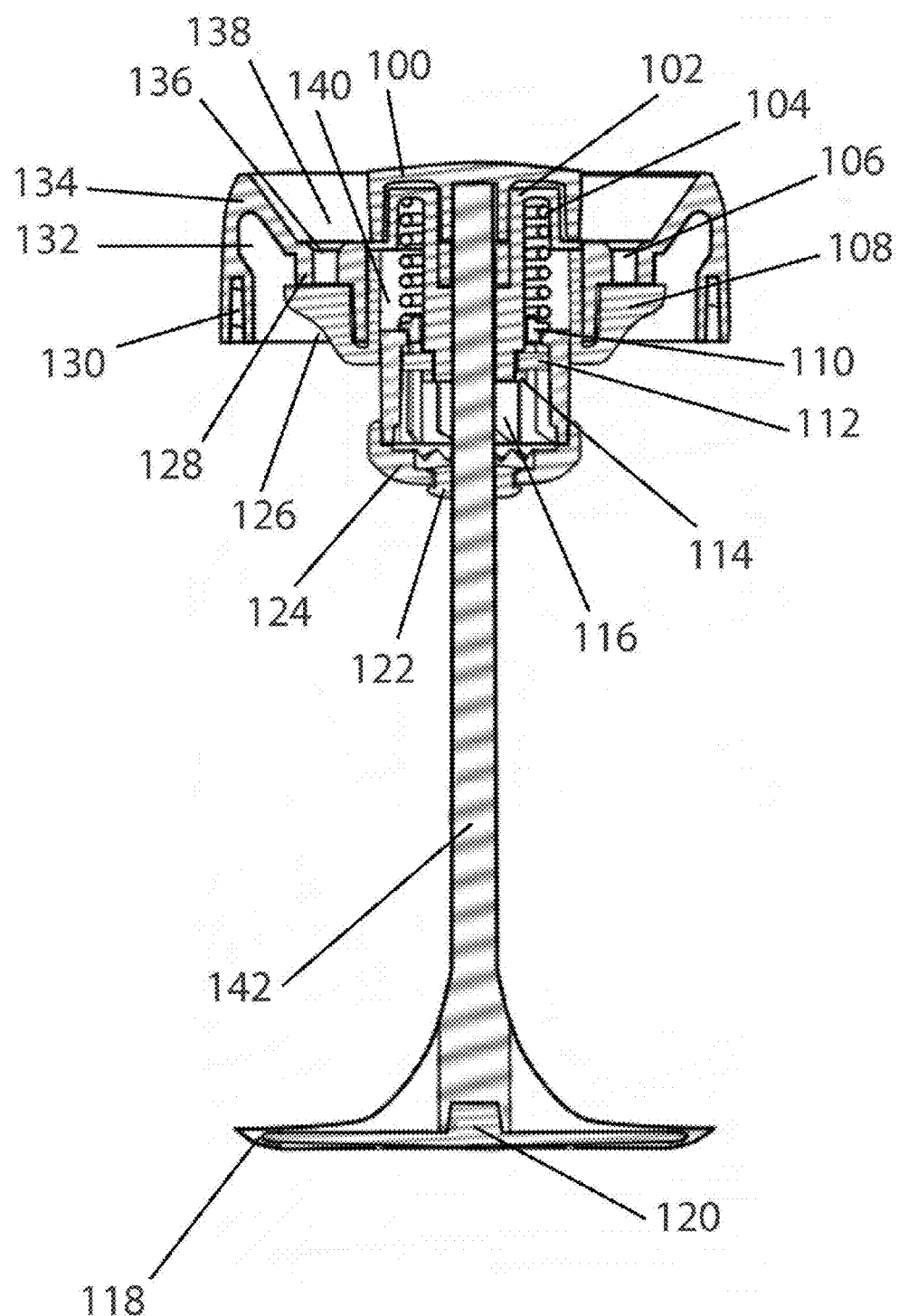
FIG. 4 is a view of one embodiment of the invention, which shows a split side plan view of the invention in the closed position.
Figure 5:
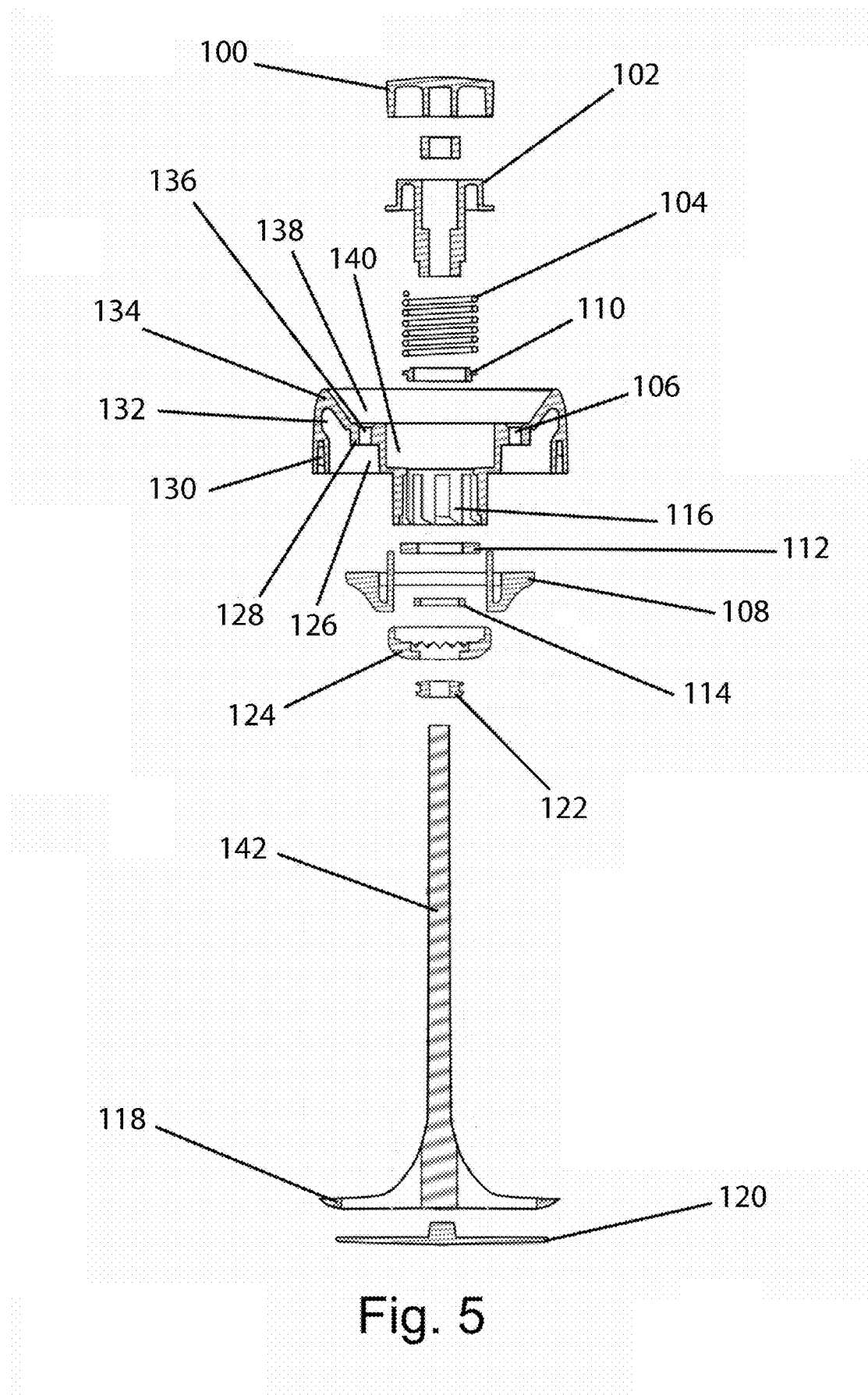
FIG. 5 is a view of one embodiment of the invention, which shows a split exploded view.

100 press handle
102 actuator
104 coil spring
106 first drink hole
108 drink seal
110 internal gasket
112 spinning cog
114 cog lock
116 inverted cog
118 press gasket
120 press filter screen
122 lower gasket
124 cog spinner
126 inside surface
128 retainer wall
130 threaded connector
132 reservoir
134 top body
136 second drink hole
138 drinking surface
140 handle nest
142 press shaft

Figures for Second Preferred Embodiment

Figure 6:
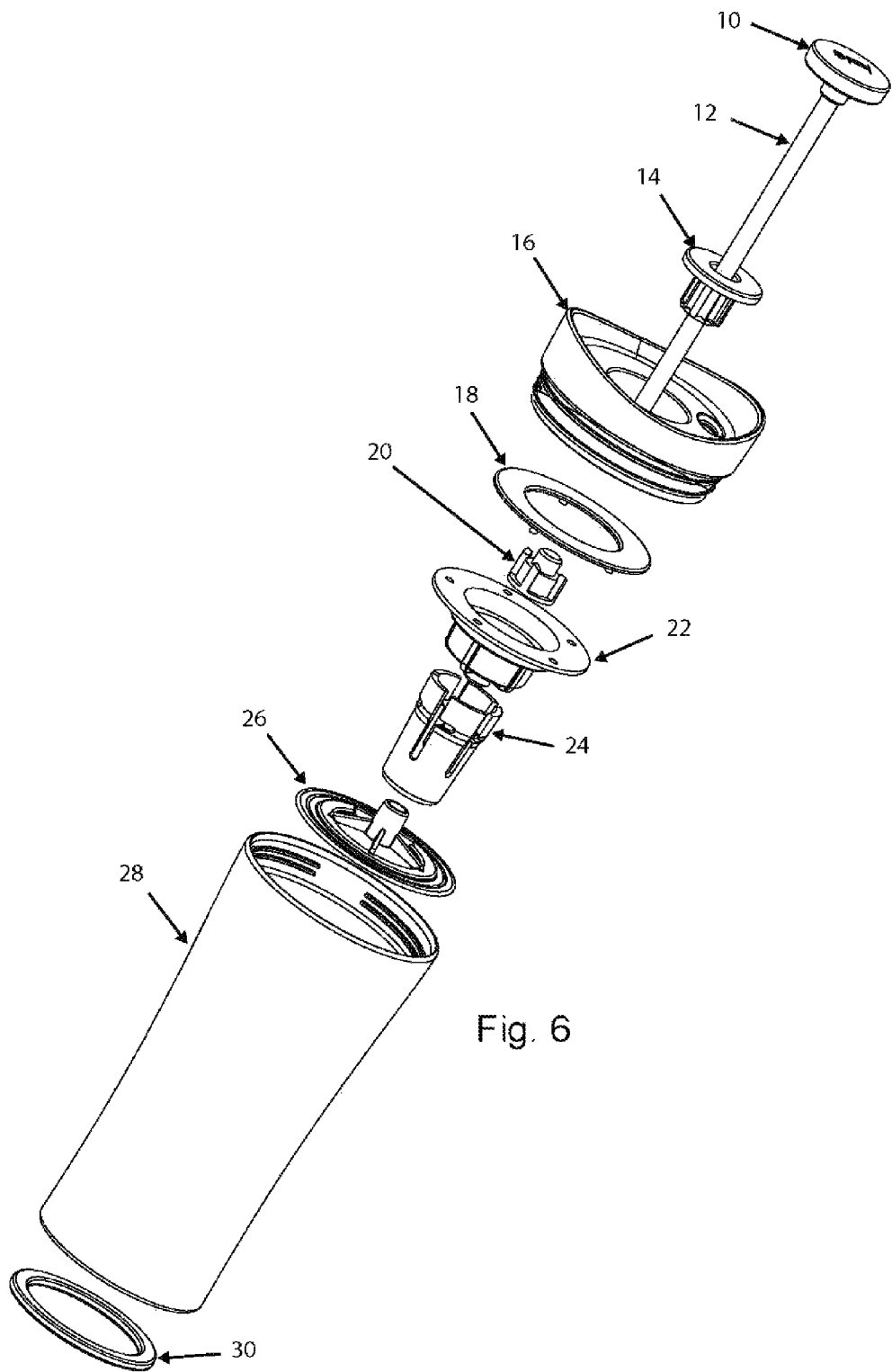

FIG. 6 is an exploded view of the second preferred embodiment of the apparatus for brewing beverages; note FIG. 6 does not show a coil spring, which should fit in between the plunger and the spring housing. Note that the second end of the shaft should extend through the plunger, spring, and spring housing and finally connect with the filter assembly.

Figure 7:
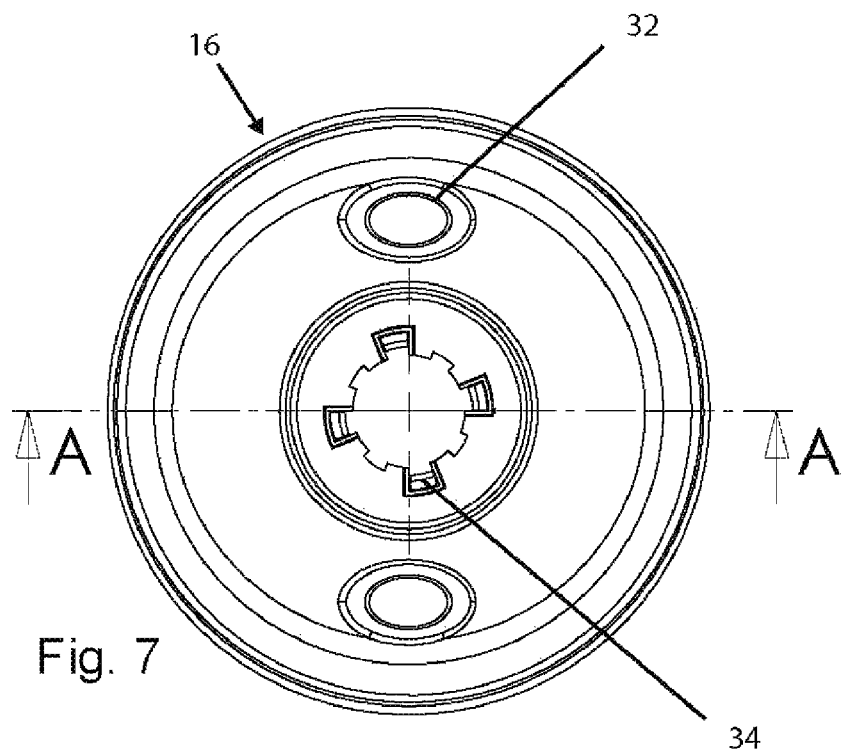

FIG. 7 is a top or overhead view of the second preferred embodiment of the apparatus for brewing beverages, namely the lid or top.

Figure 8:
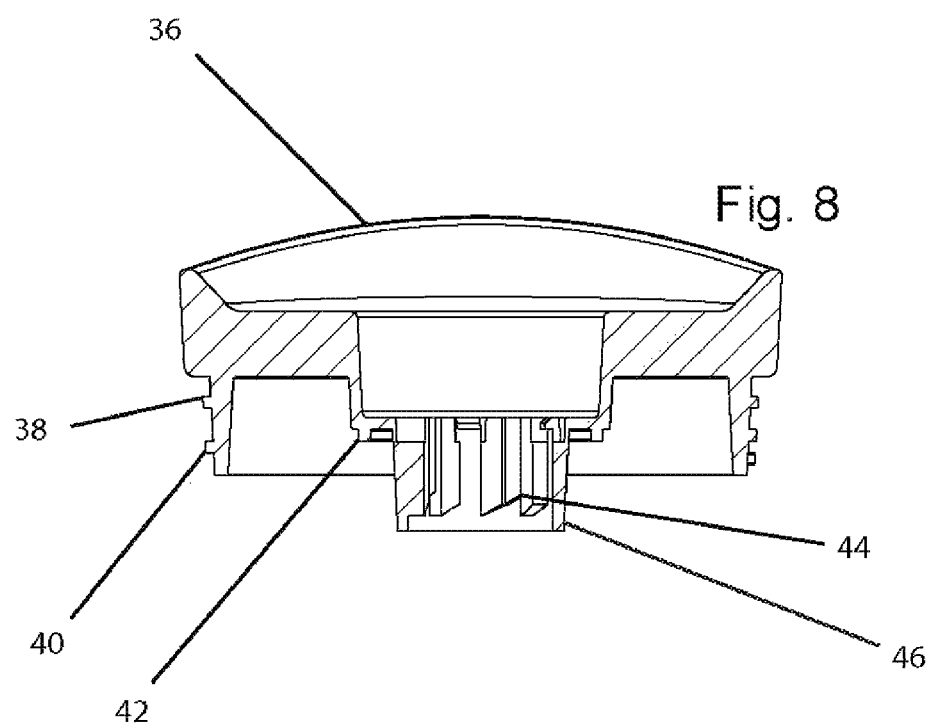

FIG. 8 is a side cross-sectional view of the second preferred embodiment of the apparatus for brewing beverages, namely the lid or top, along sight lines A-A as shown in FIG. 7.

FIG. 9A is a bottom plan view of the handle platform of the second preferred embodiment of the apparatus for brewing beverages.

FIG. 9B is a perspective view of the handle platform of the second preferred embodiment of the apparatus for brewing beverages; note the tab structures 48 on the second end of the handle platform, which interacts with the Handle Platform Locking Mechanism on the top or lid (in a hook and ledge connection).

FIG. 9C is a side plan view of the handle platform of the second preferred embodiment of the apparatus for brewing beverages.

FIG. 10A is a bottom plan view of the cog structure 20, which interfaces with the lid 16, handle platform 14 and plunger 22.

FIG. 10B is a perspective view of the cog structure 20 of the second preferred embodiment of the apparatus for brewing beverages.

FIG. 10C is a side plan view of the cog structure 20 of the second preferred embodiment of the apparatus for brewing beverages.

FIG. 11A is a bottom plan view of the plunger structure 22, which interfaces with the cog structure 20 and a spring and the spring housing.

FIG. 11B is a perspective view of the plunger structure 22 of the second preferred embodiment of the apparatus for brewing beverages.

FIG. 11C is a side plan view of the plunger structure 22 of the second preferred embodiment of the apparatus for brewing beverages.

FIG. 12A is a top plan view of the Spring Housing 24, which holds the spring and compresses the assembly together; note the male structure or boss 78, which is on the inner surface of the spring housing and extends inwardly from the second end of the spring housing and interacts with one end of the spring.

FIG. 12B is a perspective view of the Spring Housing 24 of the second preferred embodiment of the apparatus for brewing beverages.

FIG. 12C is a side plan view of the Spring Housing 24 of the second preferred embodiment of the apparatus for brewing beverages.

Figures for Third Preferred Embodiment

Figure 13:
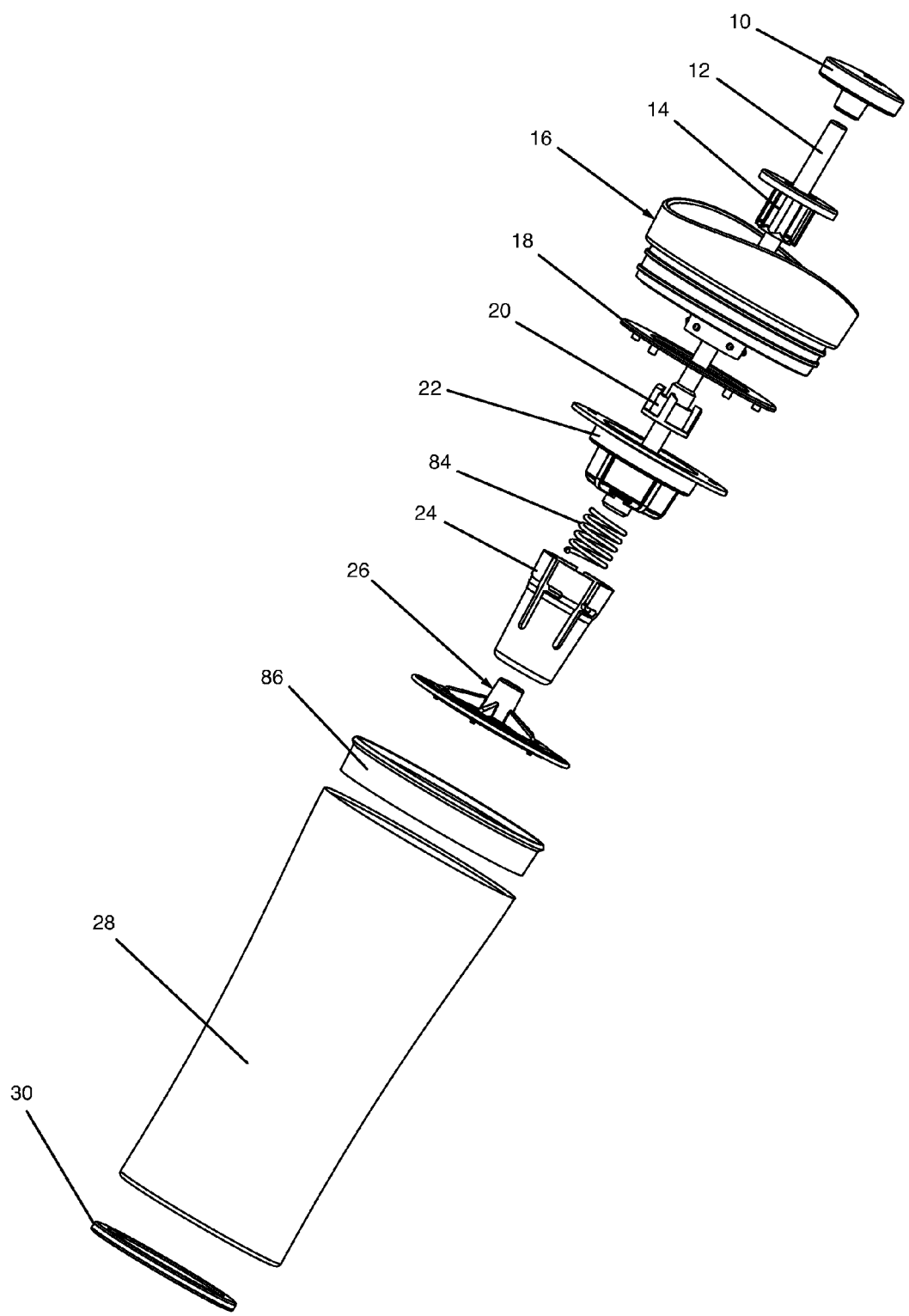

FIG. 13 is an exploded view of a third preferred embodiment of the apparatus for brewing beverages. Note that the second end of the shaft should extend through the plunger, spring, and spring housing and finally connect with the filter assembly.

FIG. 14 is a side plan view of the third preferred embodiment of the apparatus for brewing beverages.

FIG. 15 is a cross-sectional view of the third preferred embodiment of the apparatus for brewing beverages, along sight lines A-A as shown in FIG. 14.

Figure 16:
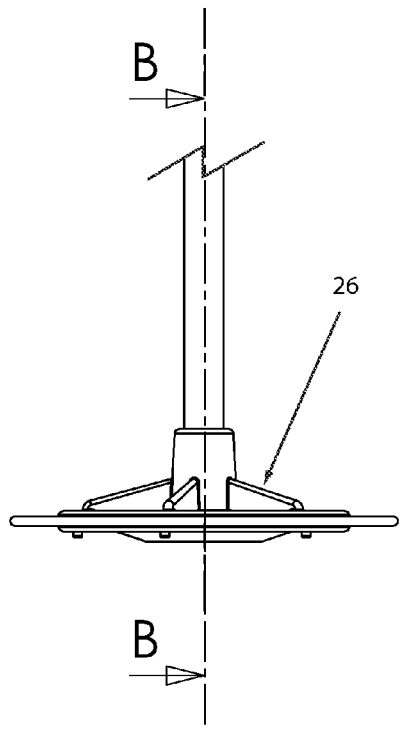

FIG. 16 is a side plan view of the filter press end of the shaft of the third preferred embodiment of the apparatus for brewing beverages.

Figure 17:
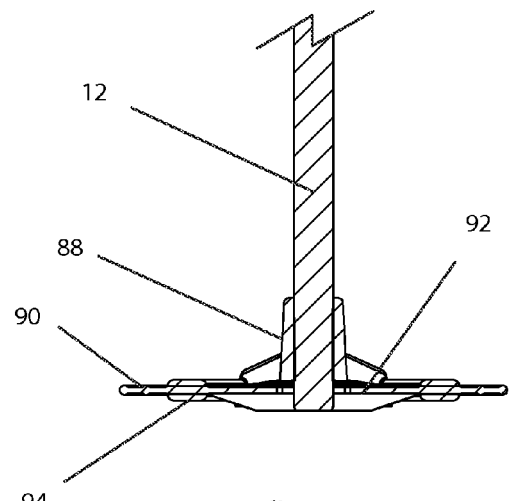

FIG. 17 is a cross-sectional view of the filter press end of the shaft of the third preferred embodiment of the apparatus for brewing beverages, along sight lines B-B as shown in FIG. 16.

Figure 18:
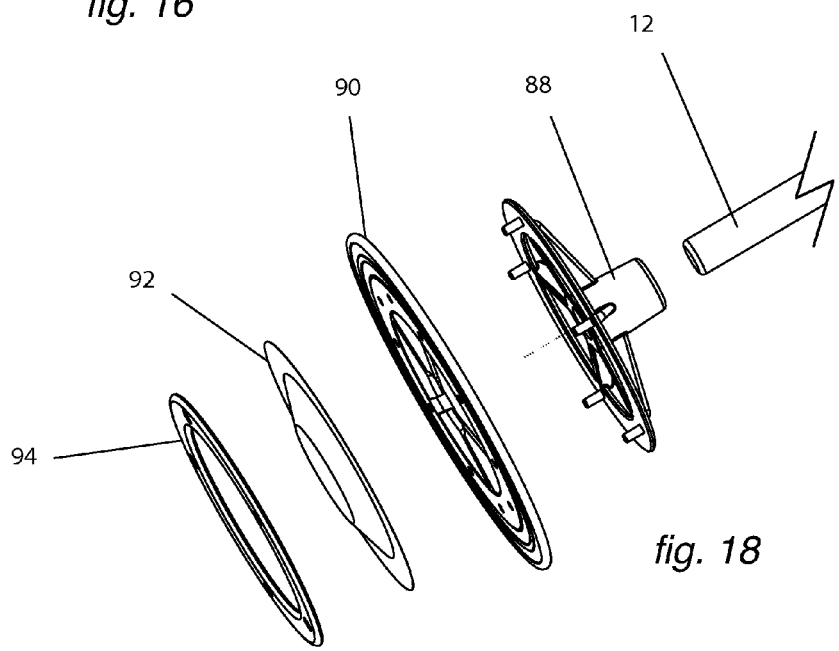

FIG. 18 is an exploded view of the filter press end of the shaft of the third preferred embodiment of the apparatus for brewing beverages.

Figure 19:
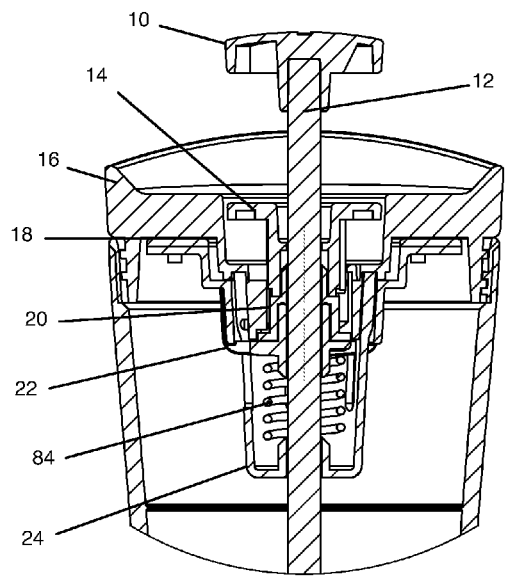

FIG. 19 is a side cross-sectional view of the third preferred embodiment of the invention in the first position (closed).

Figure 20:
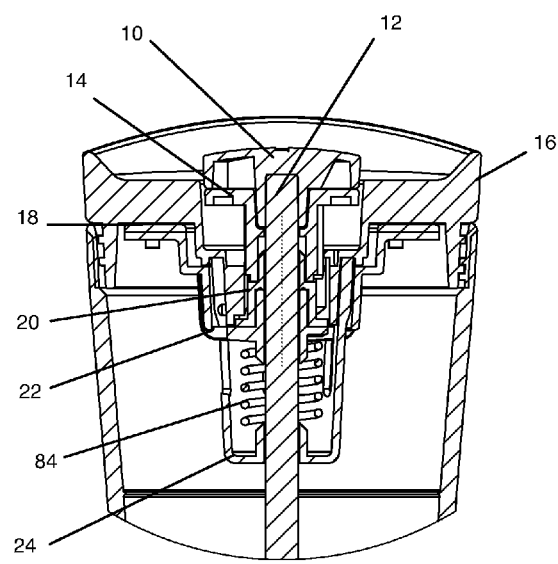

FIG. 20 is a side cross-sectional view of the third preferred embodiment of the invention in the second position (closed); note that the handle 10 engages the handle platform 14.

Figure 21:
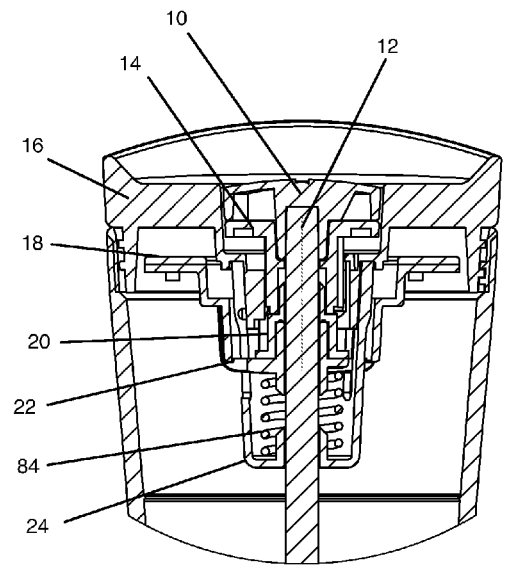

FIG. 21 is a side cross-sectional view of the third preferred embodiment of the invention in the third position (open).

Figure 22:
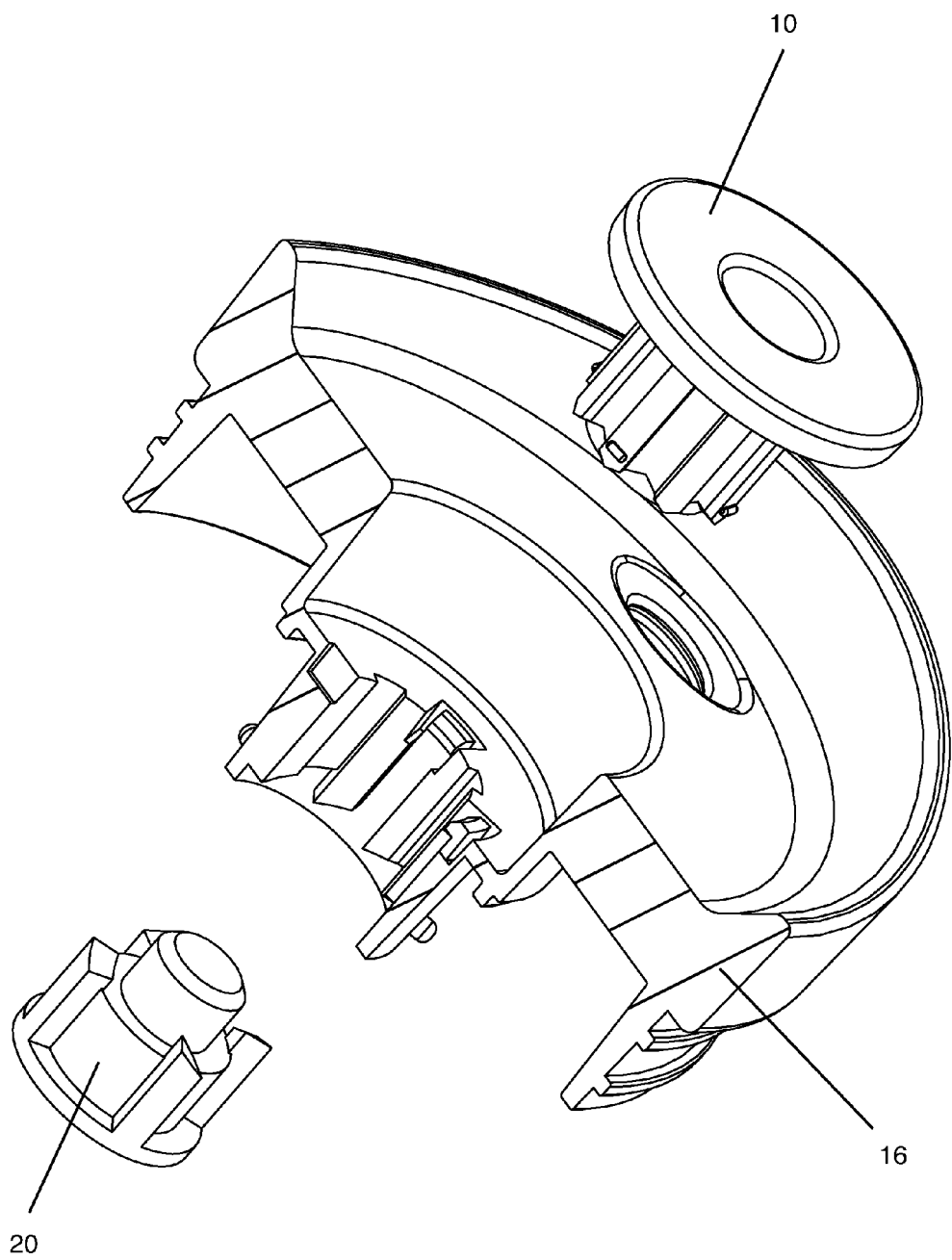

FIG. 22 is an exploded and cross-sectional view of the cog, handle platform, and lid and how these three parts integrate in the opening/closing mechanism.

PARTS LIST FOR FIG. 6-22

10. Handle/Button, which screws onto the first end of the shaft.
12. Shaft which connects the Handle (10) and Filter Assembly (26). The shaft can be hollow or solid.
14. Handle Platform, which interfaces with a centrally located opening on the lid 16.
16. Lid, which the handle/button, shaft (with filter press end), handle platform and locking mechanism, plunger, spring and spring housing connect and engage.
18. Gasket, which connects to the plunger. The gasket (with the plunger) interfaces with the lid to seal and unseal the drink/vent holes.
20. Cog, which interfaces with the Lid (16) Handle Platform (14) and Plunger (22).
22. Plunger, which Interfaces with the Cog (20) and a spring. Due to the urging from spring, the plunger and the plunger gasket help close the drink hole or vent openings on the lid.
24. Spring Housing, which holds a spring and compresses the assembly together.
26. Filter Assembly, which is attached the bottom or second end of the shaft.
28. Housing, Main Body, or Cup.
30. Rubber grip, which is attached to the cup to prevent it from slipping.
32. Drink hole or vent hole. There should be at least two holes on the cup lid (One is for drinking and the other is to let air into the housing or vessel).
34. Handle Platform Locking Mechanism, which is a tab which receives the Handle Platform and Locks it in place.
36. Raised spout for interfacing with a user's lips.
38. O-Ring channel, which receives an O-Ring.
40. Thread, which screws into the Cup Threads.
42. Locking ring, which keeps the Spring Housing secured onto the lid. This locking ring structure helps keep the Spring Housing from flexing and popping off the apparatus.
44. Rails on the lid (inner surface of the third flange) which receive the Advancers on the Handle Platform and help manipulate the Cog.
46. Male portion of the interface between the lid and spring housing. The attachment is either a screw thread, or bayonet clip.

48. Tab on handle platform which interfaces with the Handle Platform Locking Mechanism on lid. It works like a hook and ledge design.
50. Through hole or centrally located opening for the shaft.
52. Platform with which the handle coincides or interacts.
54. Advancers, which push the Cog and advances the cog into the next position.
56. Where the cog interfaces with the Plunger. The Cog receives a male end of the plunger and spins freely.
58. Cog gear, which interfaces with the Rails on the lid and advances into the next position with spring pressure.
60. Through hole or centrally located opening for the shaft.
62. Male interface for the cog and handle platform.
64. Holes are where the gasket is heat staked onto the plunger.
66. Male interface which goes into the female cog interface.
68. Arms, which protrude a structure on the outside of the mechanism assembly.
70. Through hole or centrally located opening for the shaft.
72. Sleeve, which wraps around the spring housing.
74. Platform where the gasket goes.
76. Male end to receive a spring end.
78. Other male end to receive a spring end.
80. Interface which connects the spring housing onto the lid.
82. Through hole or centrally located opening for the shaft.
84. Spring—coil spring.
86. Thread insert.
88. Press Filter upper housing.
90. Check Valve—can be made of silicone or other suitable flexible and durable and heat resistant materials.
92. Conical filter.
94. Press filter lower housing.

DESCRIPTION OF THE PREFERRED EMBODIMENTS

Referring to FIGS. 1 through 5, there is illustrated a top for a beverage press which incorporates an apparatus for hiding the press handle, opening and closing the drink hole, and preventing unwanted sediment from moving through the drink hole.

Viewing FIG. 1, this top for a beverage press has the first body (132) which comprises two significant sides; the drinking surface (138) and the inside surface (126). The said first body's drinking surface comprises at least one drink hole (106) for the beverage liquid to be distributed from. The said first body's drinking surface also comprises a vent or second optional drink hole (136). The said first body's drinking surface also comprises a nest section (140) that receives the body of the press handle (100). Inside the said nest section comprises a through-hole which receives the shaft of the press. The said first body's inside surface comprises a reservoir section (132) that collects unwanted sediments away from the said drink hole. The said first body's inside surface comprises a retainer wall (128) around the drink hole to further help divert unwanted sediments into the said reservoir section. The said first body's inside surface comprises a threaded connector (130) that connects the said top body to a beverage container.

Inside the center through hole located on the first body is where the mechanism is assembled. First, a ring shaped internal gasket (110) is placed from the drinking surface side of the said first body. Then a coil spring (104) is placed on top of the gasket from the same side. Then a tubular structured actuator (102) is placed over the spring from the same side. The actuator is designed to cover the spring and help hold the spring in an aligned position. From the inside surface side of the said first body, a drink seal structure (108) is connected to the said actuator (102). From the same side a spinning ring structured cog (112) is fed into an inverted cog structure on the first body (116) and rest around the actuator (102). This spinning cog is locked in place by connecting a ring structured cog lock (116) onto the actuator (102). From the same side a ring structured cog spinner (124) is connected to the first body, sealing the mechanism together. From the inside surface side of the said first body, the press shaft (142) is guided all the way through the center through hole.

At the lower base of the press shaft is the press structure which holds a filter screen structure (120). Around the perimeter of the said lower base is a malleable seal (118) that prevents sediments from pushing through the sides. The top end of the said shaft is connected to the press handle (100) and connects all the components together.

The said first body is screwed onto a receiving cup with a threaded connector (130). The user then presses the press handle (100) all the way down. As the press handle reaches the actuator (102), they fit together. When a user continues to push down, the actuator is pushed down the spinning cog (112) until it reaches the cog spinner (124). When the spinning cog (112) reaches the cog spinner (124) the spinning cog rotates clockwise and engages another inverted cog section (116).

When the user stops pushing, the coil spring (104) pushes the mechanism up. The upward travel is limited by the spinning cog's (112) relationship to a shorter section of the inverted cog sections (116). This limitation of upward travel brings the press handle (100) to rest inside the first body's nest section (140). This limitation of upward travel also keeps the drink seal structure (108) in a lower position and allows the contained liquid to flow through the drink hole (106) or second drink hole (136).

To reset the mechanism, the user pushes again on the press handle (100). This force moves the spinning cog (112) to the cog spinner (124), rotating the spinning cog (112) into the next segment of the inverted cog (116). As the coil spring (104) pushes the mechanism up, the longer segment inside the inverted cog (116) allows the mechanism to return all the way up. This movement moves the drink seal structure (108) back to the closed position. The user can keep the beverage sealed, or can pull the press handle (100) up and then remove the top.

Second and Third Preferred Embodiments

There are also second and third embodiments for an apparatus and mechanism for personal beverage press, as shown in FIGS. 6-22. There is a body or housing or cup 28, with a closed bottom end and an open top end and a sidewall. The top end is open and receives the top apparatus or lid 16, in a screw on, threaded, friction or clamped connection; there may also be a threaded insert 86 placed within the inner portion or near the top end of the cup. The bottom end of the cup can have an optional rubber or friction grip or surface layer 30 to better help the housing from being knocked over.

Top or Lid 16:

There is illustrated a top or lid structure 16 for a beverage apparatus. This beverage top integrates a French press type coffee filter, a spring and cog style mechanism to open and to close the drink and vent holes, and a shared activation button. Note that this invention employs a closing mechanism that works independently of the press shaft.

Viewing FIGS. 6 and 7, this top 16 has a first or upper end and a second or lower end. The top 16 has at least one drink hole 32 and at least one vent hole; other embodiments have at least one opening 32 on the top or lid 16.

In addition, the lid or top 16 has a centrally located opening for receiving the handle platform 14 and shaft 12. The top surface of the lid can also have a flange or drinking surface to better enable the user's lips to engage the lip when drinking.

The second or bottom end of the lid has a first flange, a second flange, and a third flange. The first flange is near the terminal periphery of the lid; the third flange is closer to the center of the lid; the second flange lies between the first and third flanges. The first flange has threaded connectors 40 on the outside of the first flange and a channel 38 for receiving an O-ring type gasket to form a water tight seal when the lid removably engages the open end of the cup or housing.

The second flange mates with an interior portion of the plunger.

The third flange has a third flange outer surface and a third flange inner flange surface. The third flange outer surface has boss structures or male parts to connect with the side walls of the spring housing. As noted above, the spring housing can also be removably engaged to the second end of the lid using a threaded connection or a sonic weld (melt plastic together).

As shown in FIG. 8, there are rails 44 or teeth on the inner surface of the third flange of the lid. The rail 44 has a first rail end (closer to the top or first end of the lid) and a second rail end (closer to the bottom or second end of the lid); the second rail ends have jagged edges that allow for staggered movement with the cog and the handle platform. These second rail ends have terminal ends that are not relatively perpendicular with the vertical axis of the cup or shaft.

As shown in FIGS. 13-21, a third preferred embodiment has a threaded insert 86 to further help the top/lid engage the top portion of the cup. The inner surface of the threaded insert removably engages or mates with the corresponding threads on the outer surface of the first flange on the second end of the lid.

Centrally located and inside the cavity or space where the handle platform sits, the lid has a handle platform locking mechanism 34 (see FIG. 7). This handle platform locking mechanism 34 engages at least one tab structure 48 on the second end of the handle platform 14. This type of connection is a hook and ledge connection.

During assembly of the closing mechanism, the tab on the handle platform engages the handle platform locking mechanism 34 on the second end of the lid; this locking mechanism keeps the handle platform 14 into place in the lid apparatus and prevents the handle platform from jumping out of the lid during the operation of the closing/opening mechanism and the upward pressure of the spring. Note that the handle platform structure can freely move up and down a measured vertical distance, but this invention does not intend for the handle platform structure to have any rotational movement.

This locking ring 42 structure, which is near the second end of the lid, keeps the spring housing secured onto the lid; this structure helps prevent the spring housing to flex and disengage the lid. In one preferred embodiment, the inventors employed a bayonet style locking or securing mechanism with boss structures, which engage slots 80 on the side walls of the spring housing. Note that other embodiments may employ threaded connectors or a sonic weld to connect the spring housing to the lid.

Shaft 12:

There is a rod like shaft structure 12, which passes through the handle platform 14, the lid 16, the gasket 18, the cog 20, the plunger 22, the spring, and the spring housing 24. The shaft 12 can be hollow or uniformly solid; the shaft has a first end and a second end; the first end of the shaft has a handle or button 10. The second end of the shaft is guided all the way through the centrally located opening of the lid or top 16. The shaft 12 connects the activation button 10 with the filter assembly 26.

At the lower or second of the shaft, there is the filter assembly 26. Around the perimeter of the said lower base is a malleable seal that prevents sediments from pushing through the sides. As shown in FIGS. 17-18 and described in further detail below, the filter assembly 26 can also be an integrated silicone or flexible check valve with a conical filter. This check valve effectively stops brewing of the liquid which prevents unwanted brewing of the beverage; the check valve helps prevents an unwanted vacuum from forming; a vacuum makes removal of the press a bit difficult from the cup.

In the preferred embodiment, the shaft has smooth cylindrical walls, but other embodiments may employ other geometric shapes or walls with grooves. Note that the corresponding openings on the handle platform, cog, spring housing, and filter would have to correspond to the shaft geometric cross section shape.

Handle Platform 14:

As shown in FIG. 6, the handle platform structure 14 fits with the centrally located opening of the lid 16. The handle platform 14 has a first or top end and a second or bottom end. The first or top end has a flange or rim 52; as shown in FIG. 9B, the flange also has a lip structure.

The bottom or second end of the handle platform 14 has an inner second end surface and an outer second end surface. The inner second end surface should allow unrestricted movement of shaft 12. The outer second end surface of the handle platform has at least one or multiple advancer structures or teeth 54. Note that these advancers or teeth of the handle platform slidably engage corresponding grooves (in between the rails 44) on the inner surface of the third flange of the lid. This particular structure allows for movement of the horizontal platform up and down the vertical axis of the shaft or cup, but at the same time, prevents rotational movement of the horizontal platform around the axis of the shaft or cup.

These advancers 54 have a first advancer end (closest to the first end of the handle platform) and a second advancer end (closest to the second end of the handle platform). The terminal edge of the second advancer end are not flat, but rather are jagged edged or pointed to help interact with the second end of the cog for the closing/opening mechanism of the drink and vent hole openings of the lid.

The handle platform has an open or hollow portion in the middle (to slidably engage and to accommodate the shaft), and a series of outwardly facing tabs 48 on the advancers (on the second end of the handle platform). These tabs 48 on the handle platform 14 interfaces and engages with the handle platform locking mechanism 34 and works like a hook and ledge design (See FIG. 7).

In one preferred embodiment, the handle platform is inserted into the centrally located opening of the lid, and the handle platform should still be able to have measured movement up and down the central axis of the shaft, but there should be no rotational movement around the axis of the shaft. Rather, the cog will rotate around the vertical axis of the shaft or cup.

Cog 20:

As shown in FIGS. 10A-10C, there is a cog component or structure of the handle platform locking mechanism. The cog interacts with the lid, handle platform and the plunger. The cog has a relatively flat first end and a non-flat second end; the cog has an opening in the middle portion to allow the accommodation of the shaft.

The first end of the cog acts a male receptacle 56 to engage or to fit within the female end of the plunger; the cog 20 spins freely around the vertical axis of the shaft and the cup and allows up and down movement (in relation with the second end of the lid and the second end of the handle platform). The first end of the cog is relatively flat and defines a flange with a first side and a second flange side.

Arising from the second flange side, there are several cog gear structures 58, which extend towards the second end of the cog. The cog gear structures 58 have a first cog gear end (closer to the first cog end) and a second cog gear end (closer to the second cog end). The second cog gear ends are not flat, but rather, these second cog gear ends are fashioned at an angle and not perpendicular with vertical axis of the shaft or cup.

These cog gear structures 58 interface with the rail structures (of the lid), which help advance the closing/opening mechanism into the next rotational position by the upwardly directed spring pressure. These cog gears 58 are aligned relatively parallel with the axis of the shaft. As shown in FIGS. 10A-10C, these cog gears 58 are evenly positioned around the terminal edge of the cog.

The most terminal part of the second end of the cog defines a boss structure, which protrudes further from the first side than the cog gears 58. Note that the second end of the cog engages the second end of the handle platform 14 and also the second end of the lid (see FIG. 6).

Plunger 22:

As shown in FIGS. 11A-11C, there is a plunger structure 22 with a first end and a second end; the plunger has a centrally disposed opening 70 for the shaft. The first end of the plunger is relatively flat and can be securely attached to the plunger gasket; this first end of the plunger (with the gasket) can engage the drink/vent holes on the lid (when the apparatus is in the closed position).

Around the terminal edges of the first end of the plunger, there can be a series or at least one connection hole or opening for grasping or connecting the plunger gasket to the plunger. This gasket can be attached with heat or other attachment means. Other embodiments of the plunger do not require a gasket and could employ a flexible layer to better seal the drink and vent hole openings.

The second or bottom end of the plunger form a series of arms or braces 68, which first protrude at a relatively perpendicular angle to the axis of the shaft; the arms then bend and align substantially parallel to the axis of the shaft and terminate near the relative center of the plunger structure. These arms 68 slidably engage or mate with channels or slot openings on the side walls of the spring housing 24 (as discussed below).

The second end of the plunger also has a male interface end 76, which engages with one end of the spring and also with the spring housing.

Spring Housing 24:

As shown in FIGS. 12A-12C, there is a spring housing structure 24. This spring housing is shaped like a smaller cup with sidewalls and a first end (top) and a second end (bottom). The spring housing structure has an opening 82 in the center to receive the shaft. The side walls of the housing 24 has channels or spring housing grooves that align and slidably engage the arms structures 68 on the plunger second end.

There are also slots 80 that interface and connect with the lid. These slots 80 are relatively perpendicular to the spring housing grooves. Note that other embodiments may employ threaded connection of the spring housing to the lid. The inside of the spring housing has a boss or an inwardly projecting male end 78 to receive one end of the spring. The other end of the spring will engage the male end of the plunger.

Filter Assembly 26:

The second end of the shaft has a filter assembly 26. The filter assembly can be a simple mesh filter with an outer perimeter area that forms a tight but movable seal with the side walls of the cup. The main disadvantage to a typical mesh filter is over brewing of the liquid; after the user presses down on the press shaft to separate the coffee grounds from the brewed coffee, the liquid still contacts the coffee grounds through the mesh filter. This continued contact can lead to over brewing and bitter tasting or acidic liquid.

To overcome this problem of over brewing of the beverage, the inventors have developed a combination of a conical filter with a flexible check valve that enables movement of the press up and down the vertical axis of the cup or shaft, but at the same time the check valve will effectively stop the brewing of the liquid. Note because the check valve does not completely stop the brewing of the liquid at the bottom end of the cup, there still may be some brewing in the lower portion of the cup, but this should be significantly less than if there was no check valve or barrier.

The third preferred embodiment employs a filter assembly that has a press filter upper housing 88, a check valve 90, a conical filter 92 and press filter lower housing 94. The Check Valve can be made of silicone or other suitable flexible and durable and heat resistant materials. The check valve can flex in either direction (up and down and along the shaft axis).

When the press is lowered, the check valve can flex upwardly; when the press is raised, the check valve can flex downwardly. The conical filter allows the check valve to flex downwardly while filtering coffee grinds, tea leaves or other beverage flavoring materials.

Use of the Apparatus to Brew Beverages:

The user will place the beverage flavoring or brewing material (coffee grounds, tea, etc.) into the cup and add the proper amount of hot or cold water; the user will place the integrated coffee press and open/close lid on the top portion of the cup; the press portion of the shaft will be in the first or upper press position; this first or upper press position is the highest elevation of the shaft.

After allowing enough time for brewing of the beverage, the user will push the press button down to the second or lower press button position and until the second end of the shaft separates the brewing material from the brewed liquor. Note that the drink and vent holes are still closed during the first and the second press button positions.

To open the drink and vent holes, the user will continue to push the activation button down so that the button reaches and engages the handle platform. By pushing down on the activation button, the user will also push down on the handle platform (and along the vertical axis of the shaft), which in turn pushes the cog vertically downward. At the same time, as the second end of the handle platform engages the second end of the cog structure, the spring is pushing up on the plunger, which in turn pushes up on the cog.

The combination of the downward pressure applied by the user and the upward pressure of the spring (i.e. these vertical pressures) causes the second end of the cog to push against the second end of the handle platform; these vertical pressures causes the respective second ends of the cog and the handle platform/lid to translate this vertically applied energy into a rotational movement. Since the second end of the cog and the second end of the lid and handle platform have non-flat edges or triangular-like edges, these non-flat edges or triangular-like edges help the second ends of the cog to move from a first rotational position to a second rotational position around the stationary second ends of the lid and the handle platform.

In addition, when the second end of the handle platform moves the second end of the cog vertically below the second end of the lid, the second end of the cog moves free of any interference of the second end of the teeth of the third flange of the lid. This creates limited rotational movement of the cog within the opening/closing mechanism.

This movement from a first rotational position to a second rotational position allows the plunger to move from a closing position (higher elevation) to an opening position (lower elevation).

In other words, this same downward pressure causes the spring to put resistance and pressure to push the second end of the cog against the second end of the handle platform so that the vertically applied pressures get translated into rotational motion of the cog around the vertical axis of the shaft (i.e., causes the cog to advance rotationally or axially around the axis of shaft) to a second cog position.

To close the drink or vent holes, the user pushes again and downward on the press handle 10. The activation button can travel at a lower elevation than the top surface of the lid. This downwardly applied force fights against the spring's upward force and translates into movement of the cog against the lid and handle platform and moves the opening/closing mechanism to the next rotational position. This rotational movement of the cog allows the cog gears to assume another position around the axis of the cup and into the groove or space between the rails on the inner surface of the lid (third flange), and the upward pressure from the spring pushes up the plunger and the cog; the cog in turn pushes up the handle platform; as a result, the plunger 22 moves to a different and higher elevation to close the drink hole and vent hole openings. This open/close mechanism coordinates vertically applied pressure and movement and controlled rotational movement.

Note that in the open position, the activation button preferably is at the same level as the lid upper surface so that the user's nose does not bump this activation button when drinking from the cup. In the closed position, the activation button preferably can be above the level of the lid upper surface so that the user can more easily grasp the activation button to lift up the filter assembly.

Notes on the Second and Third Embodiments

The second and third preferred embodiments have eliminated the need for the gaskets in the cog assembly. The second and third embodiments employ fewer parts and can use other materials other than metal or metal alloy components, such as plastics and ABS.

The shaft 12 moves independently of the open/close button (handle platform 14). Viewing the exploded views of FIGS. 6 and 13, the cog mechanism 20, which interacts with the handle platform 14, allows actuation of the open/close button (handle platform 14) from an open (first) position to a closed (second) position. This invention allows for movement of the handle 10 and shaft 12 to move independently of the open/close button of this device.

The filter assembly uses a conical filter with a flexible check valve or a reverse check valve. This invention provides for a means for stopping the brewing of the coffee by physically separating the coffee grounds or tea leaves from the liquid. At the bottom of the press (see Filter Assembly 26), there will be a flexible check valve or flexible reverse check valve 90, which is placed over a filter.

The filter will separate the coffee grounds from the liquid, but the mesh does not prevent continuous brewing of the coffee. The check valve acts a physical barrier to keep the liquid from being in "brewing contact" with the coffee grounds or tea leaves.

Upon use of the device, the user will press down on the handle and push the filter assembly to the bottom of the cup; the filter will separate the liquid from the grounds, but the addition of the flexible check valve or reverse check valve will further keep the grounds from brewing the liquid. When done with the brewing, the flexible reverse check valve will prevent a vacuum from forming when lifting up the handle to remove the filter assembly.

The cup preferably can be microwavable (separate from the lid and closing mechanism as shown in Embodiments 1-3). This invention's push button open/close mechanism allows for one handed use, which is very convenient for use in car or automobile. The push button design also allows for the placement of the activation button in a lower elevation so that the user's nose does not hit the activation button when the user drinks from the cup lid.

Other Possible Closure Mechanisms:

In addition to the push button open/close mechanism as described above, another embodiment could include a combination rotating key that allows for movement up and down a vertical axis and around the vertical axis. The key will have grasp points for the user's fingers or digits. The key will interface with a rotating closing mechanism; the rotating closing mechanism uses a threaded connection or a bayonet connection to the lid surface. As the closing mechanism is moved from a closed to an open position, there is rotational movement, but also elevational movement due to the threads or bayonet connection. Also, a leaf spring could be employed with the bayonet connection.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

Any element in a claim that does not explicitly state "means for" performing a specific function, or "step for" performing a specific function, is not be interpreted as a "means" or "step" clause as specified in 35 U.S.C. Sec. 112, Paragraph 6. In particular, the use of "step of" in the claims herein is not intended to invoke the provisions of 35 U.S.C. Sec. 112, Paragraph 6.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

We claim:

1. An apparatus for brewing a liquid beverage with a beverage flavoring material comprising:
   a cup having an open top end and a closed bottom end;
   a sidewall extends from the bottom end to the open top end of the cup;
   a lid removably engages the open top end of the cup;
      the lid having a first lid opening and a second lid opening; the second lid opening is centrally disposed;
      the lid having a first lid end and a second lid end;
   a shaft, which slidably engages the centrally disposed second lid opening;
      the shaft has a first shaft end and a second shaft end;
      the first shaft end has an activation button;
      the second shaft end has a filter assembly;
   the lid further comprising an opening and closing mechanism for the first lid opening; the opening and closing mechanism comprising:
      a handle platform having a first handle platform end and a second handle platform end and a centrally located handle platform opening, which can slidably engage the shaft;
      the first handle platform end being able to engage the activation button;
      a cog structure, which can rotate around a vertical axis of the shaft; said cog structure having a first cog end and a second cog end and a centrally located cog structure opening, which can slidably engage the shaft;
      the second cog end being able to removably engage the second handle platform end and the second lid end;
      a plunger structure with a first plunger end and a second plunger end and a centrally located plunger opening, which can slidably engage the shaft;
      a spring;
      a spring housing with a first spring housing end and a second spring housing end and a centrally located spring housing opening, which can slidably engage the shaft;
      the first spring housing end is removably connected to the second lid end;
      the spring is placed between the second spring housing end and the second end of the plunger,
      whereby the sliding shaft allows movement of the filter apparatus to be moved from a first elevation to a lower second elevation to separate the beverage flavoring material from the liquid beverage and the opening and closing mechanism can assume a first closed position to a second open position.

2. The apparatus of claim 1, wherein the filter assembly comprises a first filter housing and a second filter housing; between the first and second filter housings, there is a flexible check valve and a filter.

3. The apparatus of claim 1, wherein the lid has a third lid opening.

4. An apparatus for brewing a liquid beverage with a beverage flavoring material comprising
   a cup having an open top end and a closed bottom end;
      a sidewall extends from the bottom end to the open top end of the cup;
   a lid, which removably engages the open top end of the cup;
   the lid having a first lid opening and a second lid opening;
      the lid further having a third lid opening, which is centrally disposed;
      the lid having a first lid end and a second lid end;
   a hollow shaft slidably engages the centrally disposed second lid opening;
      the shaft has a first shaft end and a second shaft end;
      the first shaft end has an activation button;
      the second shaft end has a filter assembly; the filter assembly comprises a first filter housing and a second filter housing; between the first and second filter housings, there is a flexible check valve and a filter;
   the lid further comprising an opening and closing mechanism for the first and the second lid openings; the opening and closing mechanism having:
      a handle platform having a first handle platform end and a second handle platform end and a centrally located handle platform opening, which can slidably engage the shaft;
      the first handle platform end being able to engage the activation button;
      a cog structure, which can rotate around a vertical axis of the shaft; said cog structure having a first cog end and a second cog end and a centrally located cog structure opening, which can slidably engage the shaft;
      the second cog end being able to removably engage the second handle platform end and the second lid end;
      a gasket;
      a plunger structure with a first plunger end and a second plunger end and a centrally located plunger opening, which can slidably engage the shaft;
      said gasket is fixedly attached to the first plunger end and can removably contact said first and second lid openings;
      a spring;
      a spring housing with a first spring housing end and a second spring housing end and a centrally located spring housing opening, which can slidably engage the shaft;
      the first spring housing end is removably connected to the second lid end;
      the spring is placed between the second spring housing end and the second end of the plunger;
      whereby the sliding shaft allows movement of the filter apparatus to be moved from a first elevation to a lower second elevation to separate the beverage flavoring material from the liquid beverage and the opening and closing mechanism can assume a first closed position to a second open position.

* * * * *